J. H. WEBSTER.
NUT-LOCK.

No. 172,805. Patented Jan. 25, 1876.

ATTEST:
Robert Burns.
Chas. J. Gooch

INVENTOR:
Joseph H. Webster
By Knight Bros.
Attys.

UNITED STATES PATENT OFFICE.

JOSEPH H. WEBSTER, OF ST. LOUIS, MISSOURI, ASSIGNOR OF ONE-HALF HIS RIGHT TO WILLIAM L. REYNOLDS, OF SAME PLACE.

IMPROVEMENT IN NUT-LOCKS.

Specification forming part of Letters Patent No. 172,805, dated January 25, 1876; application filed November 1, 1875.

*To all whom it may concern:*

Be it known that I, JOSEPH H. WEBSTER, of the city and county of St. Louis and State of Missouri, have invented a new and useful Improvement in Nut-Locks, which improvement is fully set forth in the following specification, reference being had to the accompanying drawings.

My improvement consists in a square nut with the screw-hole made eccentric, so that one part of the nut shall have such preponderance in weight that it will remain at bottom, and the nut will not be shaken from the bolt, even if loose upon it.

Figure 1:
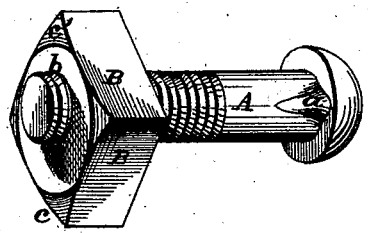
Figure 2:
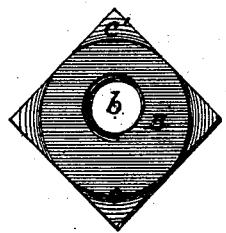

In the drawings, Figure 1 is a perspective view. Fig. 2 is an end view of the nut.

A shows an ordinary fish-plate bolt. B is the nut, having a screw-hole, $b$, eccentric to the body of metal, so that the part or side $c$ shall have preponderance over the part $c'$, and so that the part $c$ will remain at bottom, however violently the bolt may be shaken, and consequently the nut cannot become unscrewed from the bolt.

The bolt is prevented from turning by the enlargements $a$ at the head. The nut may be square, as shown, or any form of polygon; but in any case the sides would have uniformity of length, so that a single wrench would fit the nut in all positions.

In applying the bolt, if it is found that the part $c$ comes to such a place when the nut is tightened as to tend by gravity to loosen the nut, the nut is unscrewed sufficiently to allow the bolt to be turned half around, and the nut screwed up, when its tendency will be to tighten on the bolt by shaking.

This nut contains the same amount of metal as an ordinary nut, and can be manufactured at the same price.

I claim as my invention—

A nut, B, having its sides of equal length, and with its screw-hole $b$ placed eccentrically, substantially as set forth.

JOSEPH H. WEBSTER.

Witnesses:
SAML. KNIGHT,
H. HUTCHINS.